A. F. CYFERS.
CHECK HOOK.
APPLICATION FILED JULY 31, 1912.
1,048,048.
Patented Dec. 24, 1912.
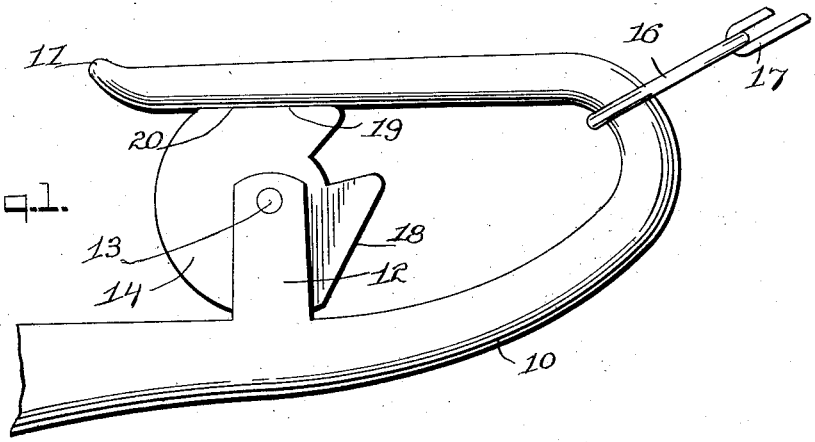
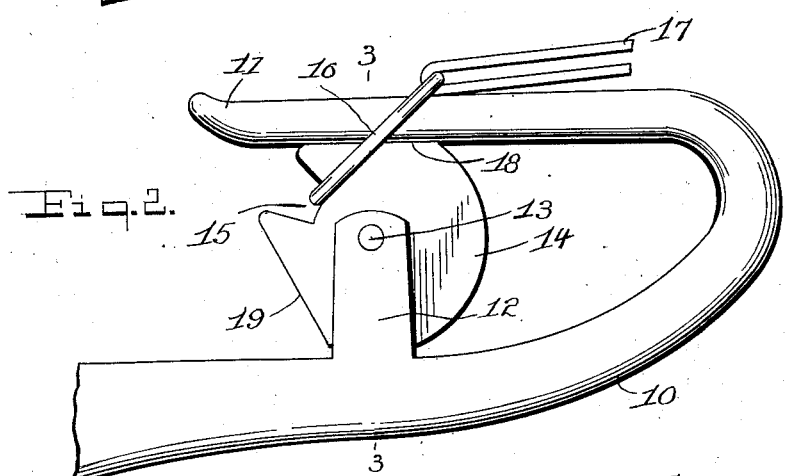
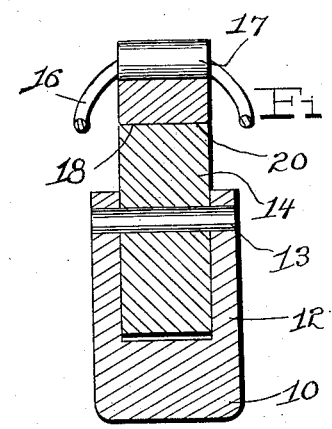
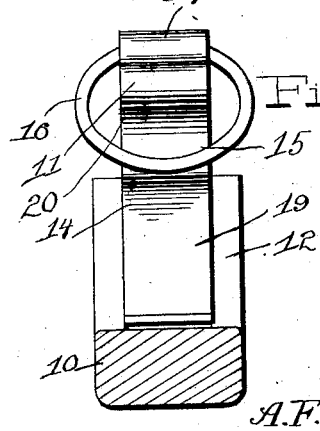
Witnesses
R. N. Jones.
J. H. M. Test.
Inventor
A. F. Cyfers.
By
Attorneys
COLUMBIA PLANOGRAPH CO., WASHINGTON, D. C.

UNITED STATES PATENT OFFICE.

ALVIN F. CYFERS, OF BUENA VISTA, OHIO.

CHECK-HOOK.

1,048,048.  Specification of Letters Patent.  Patented Dec. 24, 1912.

Application filed July 31, 1912. Serial No. 712,592.

*To all whom it may concern:*

Be it known that I, ALVIN F. CYFERS, a citizen of the United States, residing at Buena Vista, in the county of Scioto, State of Ohio, have invented certain new and useful Improvements in Check-Hooks; and I do hereby declare the following to be a full, clear, and exact description of the invention, such as will enable others skilled in the art to which it appertains to make and use the same.

This invention relates to improvements in harness, and has particular reference to a check hook.

The principal object of the invention is to provide a simple device of this character which is of the snap hook type, combining the features of the spring tongue hook and of the movable keeper type.

Other objects and advantages will be apparent from the following description and with particular reference to the accompanying drawings.

In the drawings: Figure 1 is a side elevation of my check hook showing the check reins attached, Fig. 2 is a similar view showing the check reins disengaged, Fig. 3 is a vertical transverse sectional view on the line 3—3 of Fig. 2, Fig. 4 is a rear elevation of the check hook.

Referring particularly to the accompanying drawings, 10 represents the hook which is attached to the saddle of the harness in the usual manner. The free arm 11 of the hook is slightly resilient, for a purpose to be later referred to.

Formed integrally with the lower portion of the hook and extending upwardly therefrom are the vertical perforated and spaced lugs 12, a transverse pin 13 being mounted in the upper ends of the said lugs. Rotatably mounted on the pin 13 is a wheel 14 having in one side a notch or recess 15, for the entrance of the ring 16 of the check rein 17. The disk is circular except for the portions 18 and 19 on opposite sides of the recess 15, which portions are inclined away from said recess. These flattened inclined faces are adapted to engage alternately against the under flattened face 20 of the resilient arm 11 of the hook. This will mean the parts to be in position as indicated in Fig. 2, the ring 16 is engaged over the end of the arm 11 and in the recess 15. A forward pull on the check rein causes the rear end of the inclined face 19 to raise the arm 11 so that the wheel 14 can rotate and deliver the ring in the forward part of the arm 11. When this takes place the flattened face 18 engages the under face of the arm 11 and holds the wheel 14 against rotation. The parts are then in the position represented in Fig. 1, and to remove the check rein it is only necessary to engage the ring 16 in the notch 15 and pull rearwardly on the reins to rotate the wheel 14, raise the arm 11 and permit the ring to be withdrawn from the free end of the arm 11.

The device as shown, is very simple in construction, and efficient in operation, it being only necessary, in applying the check reins, to engage the ring over the end of the arm 11 and pull forwardly on the reins. To remove the reins, a reverse pull on the reins rotates the disk and permits the ring to be withdrawn from the arm.

What is claimed is:

1. The combination with a check hook having a free resilient arm, a rotatable member within the hook, said rotatable member having oppositely inclined flat faces for engagement with the under face of the resilient arm of the hook, said rotatable member having a notch or recess for engagement by the ring of a check rein.

2. A checking device for harness, comprising a hook having a resilient arm and a rigid arm, vertically arranged spaced lugs formed on the rigid arms, a rotatable disk mounted between the lugs, said disk having a recess in one side for engagement by the ring of a check rein, flattened inclined faces on the opposite sides of the notch and on the periphery of the disk for engagement with the under face of the rigid arm of the hook whereby when one of the faces engages the said arm the disk will be prevented from rotation.

In testimony whereof, I affix my signature, in presence of two witnesses.

ALVIN F. CYFERS.

Witnesses:
  LOY HAZELBAKER,
  JAMES M. PIATT.

Copies of this patent may be obtained for five cents each, by addressing the "Commissioner of Patents, Washington, D. C."